(12) United States Patent
Angel

(10) Patent No.: US 9,193,234 B1
(45) Date of Patent: Nov. 24, 2015

(54) HITCH SHANK

(71) Applicant: Camco Manufacturing, Inc., Greensboro, NC (US)

(72) Inventor: Bruce A. Angel, Stokesdale, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 0 days.

(21) Appl. No.: 14/467,370

(22) Filed: Aug. 25, 2014

(51) Int. Cl.
*B60D 1/46* (2006.01)
*B60D 1/52* (2006.01)

(52) U.S. Cl.
CPC ... *B60D 1/46* (2013.01); *B60D 1/52* (2013.01)

(58) Field of Classification Search
CPC .................................... B60D 1/46; B60D 1/52
See application file for complete search history.

(56) References Cited

U.S. PATENT DOCUMENTS

| | | | |
|---|---|---|---|
| 5,873,594 A * | 2/1999 | McCoy et al. | 280/491.5 |
| 6,010,142 A * | 1/2000 | McCoy et al. | 280/490.1 |
| 6,341,795 B1 * | 1/2002 | Zerkel | 280/490.1 |
| D475,327 S * | 6/2003 | McCoy et al. | D12/162 |
| 6,726,237 B1 * | 4/2004 | Carrico | 280/490.1 |
| 7,055,845 B1 * | 6/2006 | Putnam | 280/504 |
| 2010/0127479 A1 * | 5/2010 | Weipert et al. | 280/491.1 |
| 2012/0112433 A1 * | 5/2012 | Williams et al. | 280/490.1 |
| 2013/0020784 A1 * | 1/2013 | Weipert et al. | 280/490.1 |

OTHER PUBLICATIONS

Five (5) page printout from amazon.com showing a Husky Center Line Forged Shank, which has seen on p. 2 has been available since Mar. 8, 2013; copyright 1996-2014 Amazon.com, Inc. or its affiliates.

* cited by examiner

*Primary Examiner* — Kevin Hurley
(74) *Attorney, Agent, or Firm* — Blake P. Hurt; Tuggle Duggins P.A.

(57) ABSTRACT

A monolithic trailer hitch including a rack defining a plurality of apertures positioned in a recessed channel and integrally formed with a perpendicularly extending arm defining a cavity and a hollow with an end formed from a pair of opposingly biased faces. A brace is connected between the arm and the rack for structural support. The cavity is the larger of the two openings and is positioned more proximal the rack while the hollow is smaller and positioned more distal the rack, near an aperture configured to receive a fastener to secure the shank to a receiver and a tow vehicle.

20 Claims, 7 Drawing Sheets

HITCH SHANK

FIELD OF THE INVENTION

The invention herein pertains to the trailer field and particularly pertains to an improved hitch shank that is forged with an advantageous geometry to improve performance and reduce material.

DESCRIPTION OF THE PRIOR ART AND OBJECTIONS OF THE INVENTION

Trailer hitch assemblies for towing a load behind a vehicle are known in the art. These types of assemblies typically include a hitch bar receiver connected to the vehicle, a hitch bar including a mounting rack or support and a post adapted for engagement with the receiver, and a ball mount configured for engagement with the mounting rack. While the general design of the assembly as described has remained largely the same, design modifications to individual assembly components have been made to improve hitch performance and decrease manufacturing materials, resulting in a lower manufacturing cost. Market pressures have led to assembly innovations but these competitive pressures are still present and further improvements relating to reducing costs and enhancing performance are needed.

Thus, in view of the problems and disadvantages associated with prior art devices, the present invention was conceived and one of its objectives is to provide a trailer shank that is efficient to manufacture and simple to use.

It is another objective of the present invention to provide a trailer shank with a plurality of apertures in the rack to permit vertical adjustment.

It is still another objective of the present invention to provide a trailer shank with a brace to increase vertical support.

It is yet another objective of the present invention to provide a trailer shank with a cavity proximate the rack.

It is a further objective of the present invention to provide a trailer shank with a hollow distal to the rack.

It is still a further objective of the present invention to provide a trailer shank with a recessed notch in the shank top longitudinal surface proximate the rack.

It is yet a further objective of the present invention to provide a method of manufacturing a lightweight trailer shank including the steps of providing a high-grade carbon steel and forging a monolithic shank as described above.

It is another objective of the present invention to provide a method of manufacturing a lightweight trailer shank that includes the step of heat-treating the shank to increase strength and performance.

Various other objectives and advantages of the present invention will become apparent to those skilled in the art as a more detailed description is set forth below.

SUMMARY OF THE INVENTION

The aforesaid and other objectives are realized by providing a trailer shank integrally formed from a rack defining a plurality of recessed apertures, an arm member, and a support brace positioned therebetween. The arm member defines a cavity more proximate to the rack and a hollow more distal in relation to the rack that are internally reinforced to maintain structural integrity while reducing the overall weight and manufacturing materials. The end of the arm member opposite the rack is formed from a pair of biased faces that are joined at a planar nose. A method of manufacturing a lightweight and structurally sound trailer shank including the steps of providing a high-grade carbon steel, forging the steel into a monolithic trailer shank as described above, and heat-treating the shank to further strengthen the shank for increased performance is also provided.

DETAILED DESCRIPTION OF THE PREFERRED EMBODIMENT AND OPERATION OF THE INVENTION

For a better understanding of the invention and its operation, turning now to the drawings, FIGS. 1-8 show various views of preferred trailer shank 10. As would be understood, shank 10 is configured for insertion into a receiver mounted on a tow vehicle and held in place with a pin (not shown). Typically, the receiver defines a substantially square cross-sectional shape, resulting in a shank defining the same cross-sectional shape. However, more recently the trailer industry has realized that the shank need not define the same cross-sectional shape to meet and exceed required performance standards.

Figure 5:
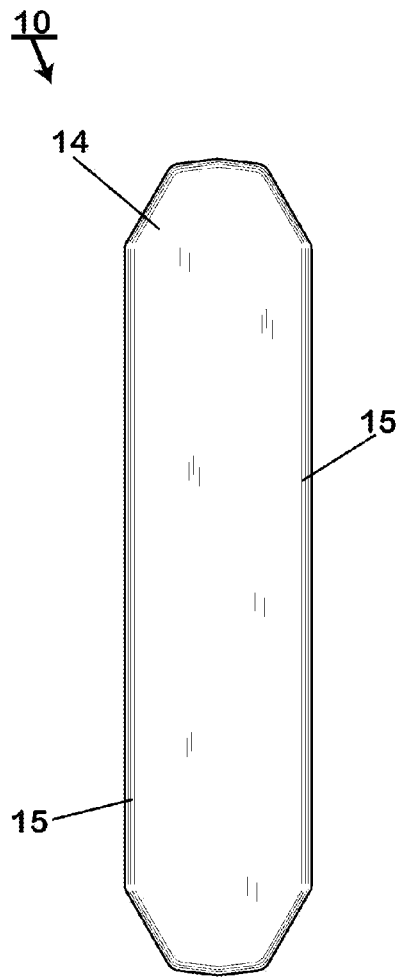
FIG. 5 illustrates a rear plan view of the shank of FIG. 1.

Preferred trailer shank 10 is integrally formed with vertical rack 11 perpendicularly oriented to horizontally extending arm 12. As shown in FIGS. 1, 2, 7, and 8, preferred rack 11 defines a plurality of apertures 13 to permit the vertical adjustment of other trailer components, for example a hitch ball assembly as is known in the art (not shown). Six (6) recessed apertures 13 are represented in this embodiment of shank 10, but it should be understood that greater or fewer apertures 13 may be defined by rack 11 and still be within the scope of the instant invention. FIG. 5 illustrates that rack 11 is preferably formed from planar end 14 that may define an octagonal (eight sided) or decagonal (ten sided) shape. Rack planar end 14 may include biased edges 15 that slope to connect with rack body 16.

Figure 1:
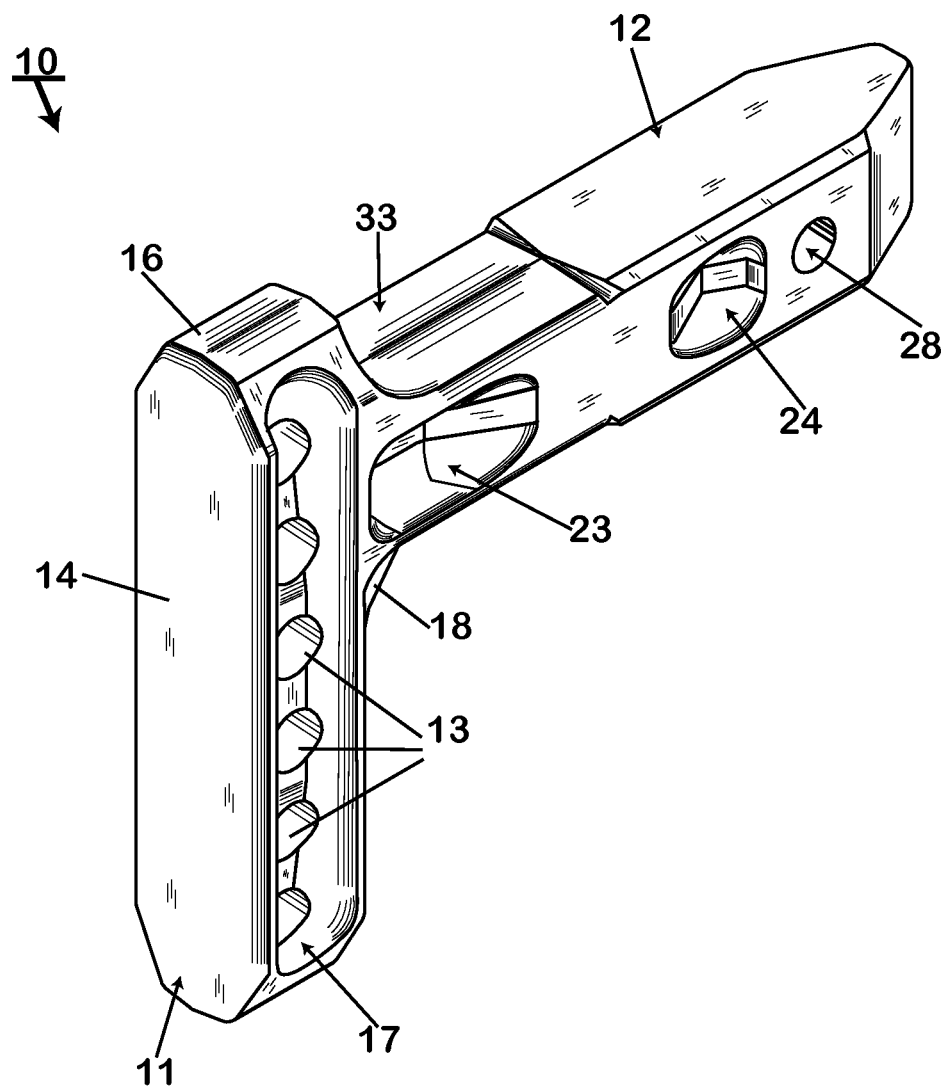
FIG. 1 shows an elevated side perspective view of a trailer shank.
Figure 2:
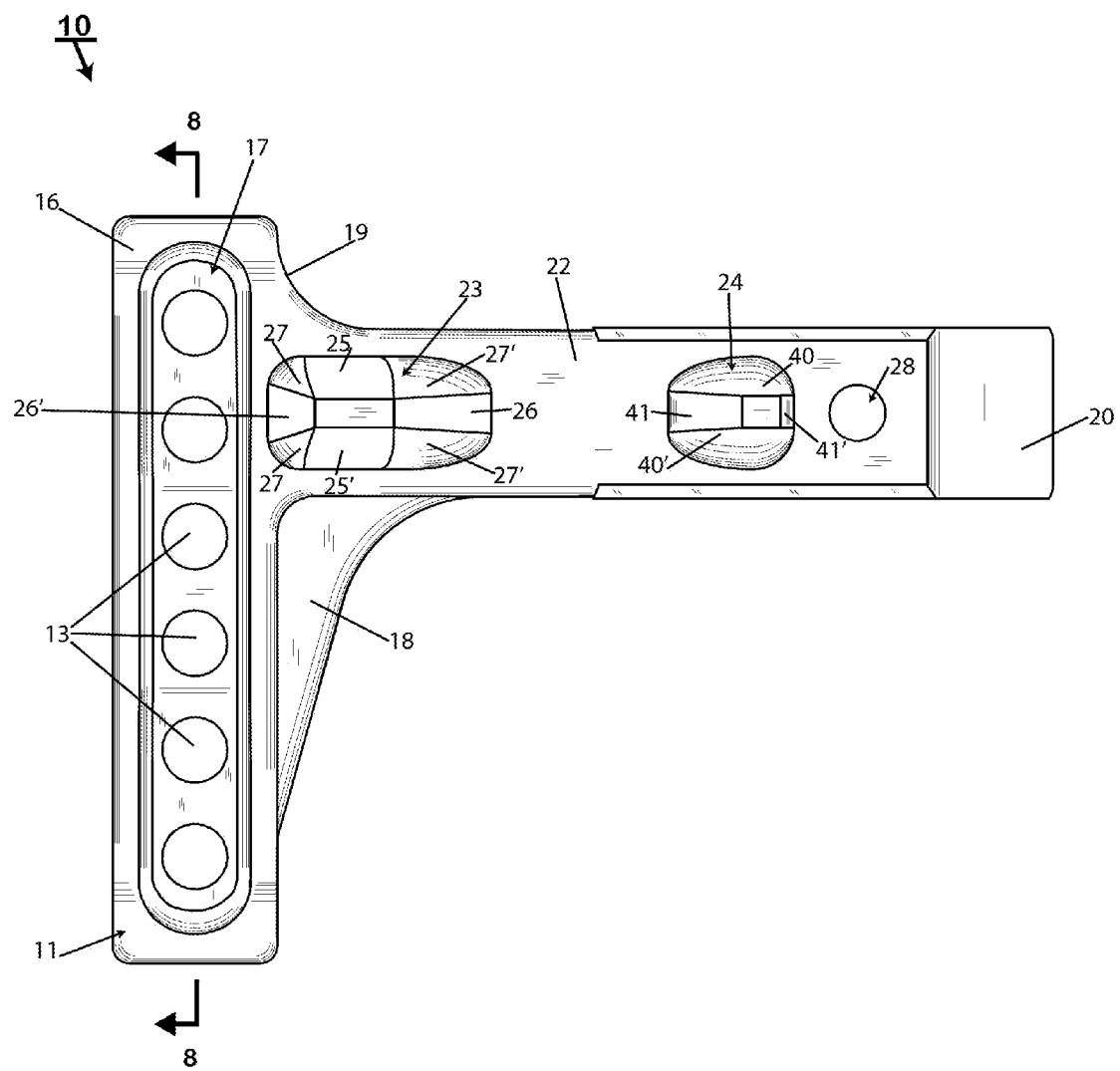
FIG. 2 pictures an elevated side view of the shank of FIG. 1.
Figure 3:
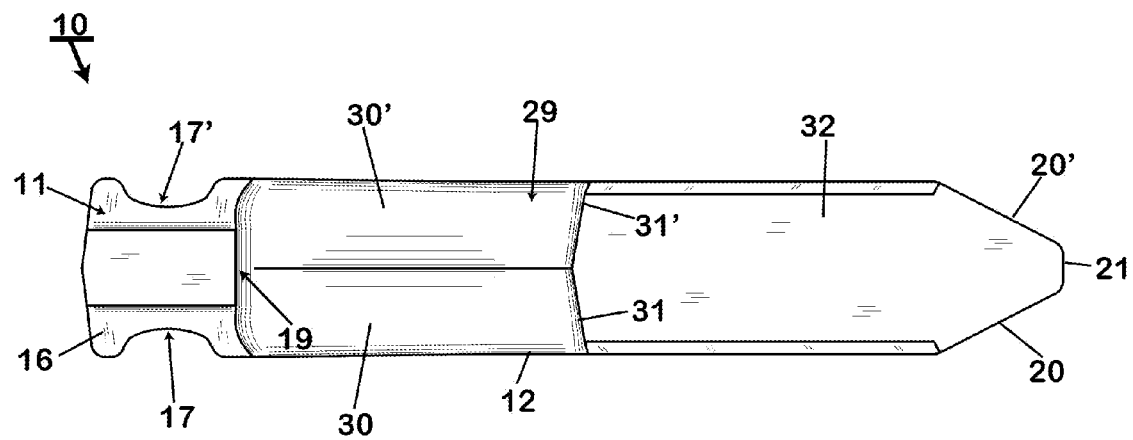
FIG. 3 depicts a top plan view of the shank of FIG. 1.
Figure 4:
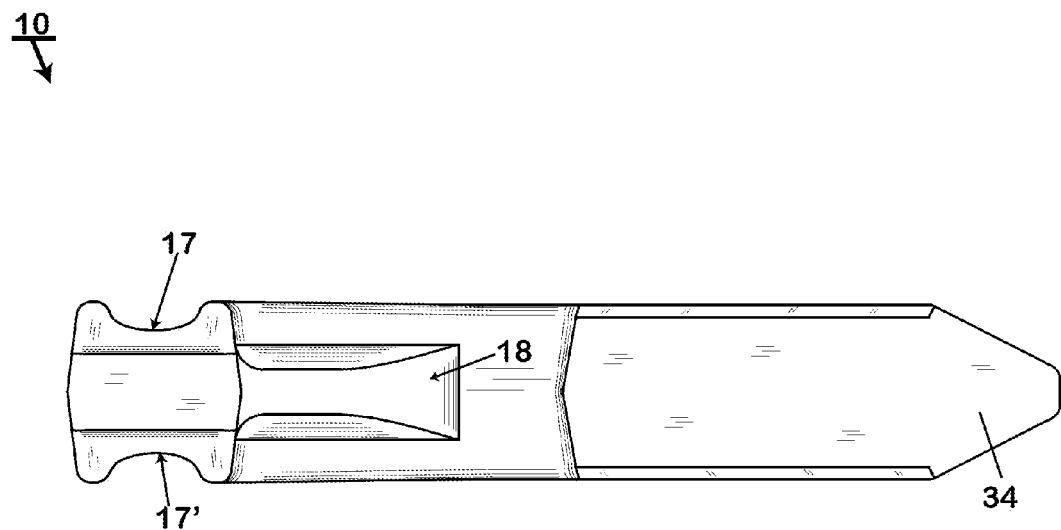
FIG. 4 demonstrates a bottom plan view of the shank of FIG. 1.

As shown in FIGS. 3 and 4, recessed channels 17, 17' are preferably formed in opposing sides of rack body 16. Apertures 13 are formed in arcuate bottom 36 of channels 17, 17' and provide a lateral bore through rack body 16 configured to receive fasteners such as pins, bolts, or the like to secure shank 10 to a hitch ball assembly (not shown). The arcuate nature of bottom 36 can more readily be appreciated in FIG. 8, which illustrates a cross-sectional view of shank 10 taken along plane 8-8 in FIG. 2. The recessed nature of channels 17, 17', coupled with the arcuate nature of bottom 36, creates an advantageous orientation for apertures 13 to receive fasteners therein. For example, when multiple fasteners are inserted into apertures 13, the force applied to those fasteners is typically distributed about those fasteners, creating an unequal force moment about the fasteners. By utilizing arcuate bottom 36 which is higher in the middle and lower at either end, the force moments are more equal which results in a more structurally stable shank 10. Recessed channels 17, 17' and arcuate bottom 36 also require less material, leading to overall lighter weight and reduced manufacturing cost.

Figure 6:
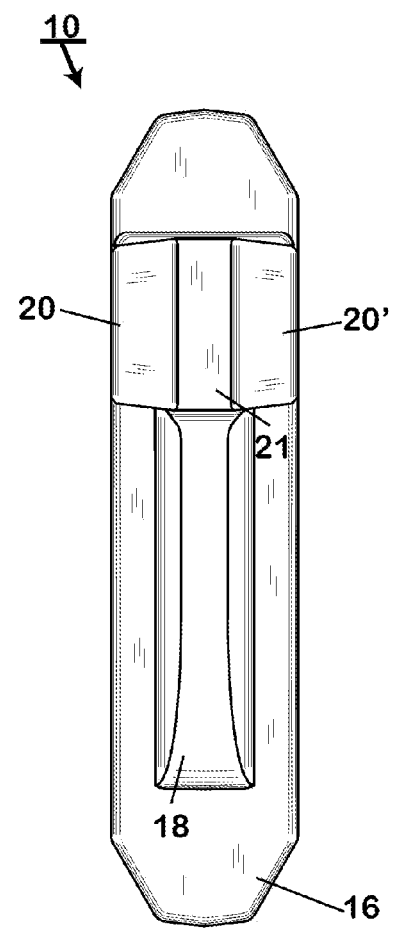
FIG. 6 features a front plan view of the shank of FIG. 1.
Figure 7:
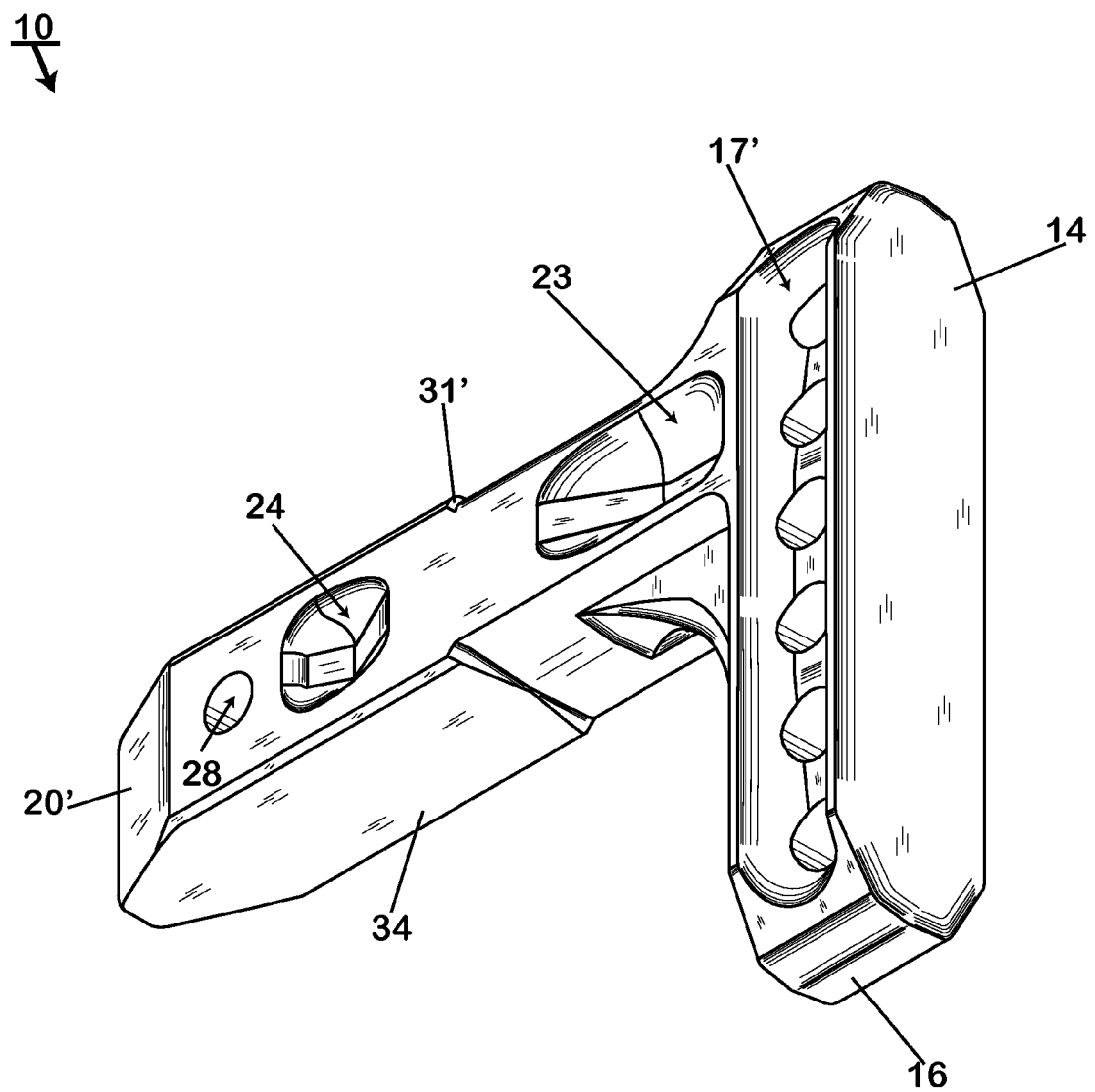
FIG. 7 shows a lowered side perspective view of the shank of FIG. 1.
Figure 8:
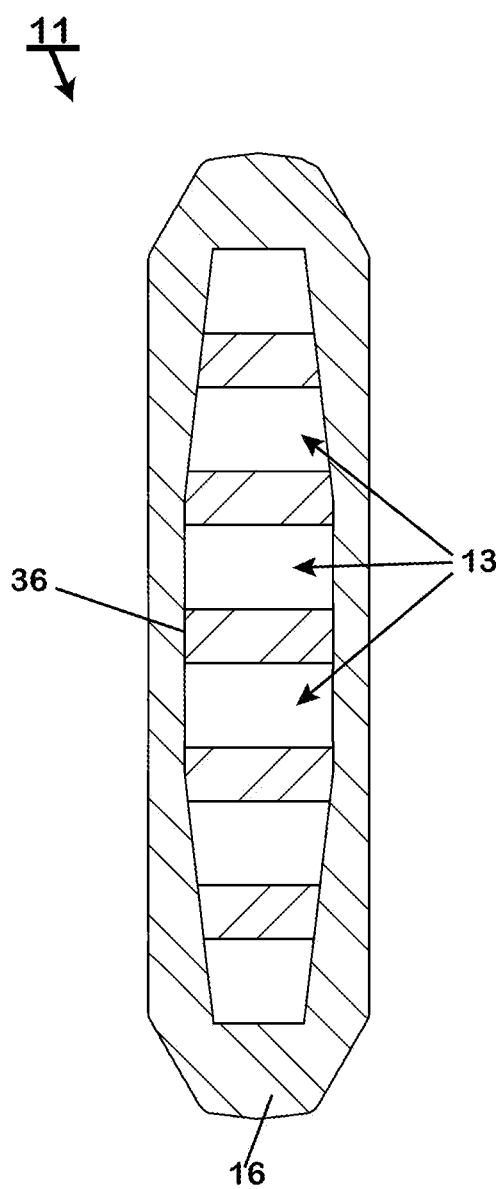
FIG. 8 depicts a cross-sectional view of the shank in FIG. 2 taken along plane 8-8.

As illustrated in FIGS. 2, 4, and 6, rack 11 and arm 12 are supported by brace 18. Unlike fillet surface 19 located on the opposing side of arm 12, brace 18 is a structural feature and is intended to be stress-bearing, resulting in rack 11 and arm 12 allowing significantly less flexion, bending, twisting, or otherwise displacement during use. Brace 18 may be formed with planar surfaces, or may be manufactured with rounded edges to avoid a cutting, scratching, or otherwise abrasive surface. Fillet surface 19 is not merely an ornamental feature of shank 10, as this design reduces material, weight, and cost of shank 10 without sacrificing performance.

As previously stated, arm 12 is perpendicularly oriented to rack 11. As shown in FIGS. 2-4 and 6-7, arm 12 is integrally molded into rack 11 at one end, and at the opposing end defines a pair of biased faces 20, 20' joined by planar nose 21. Arm 12 is preferably formed from a pair of planar sides 22, 22' opposingly affixed to arm top 29 and arm bottom 34, respectively. Arm side 22 is a mirror image of arm side 22', so for the sake of brevity, only one arm side will be described, but it should be understood that the description would apply equally to the other side. Arm side 22 preferably includes aperture 28 configured to receive a fastener such as a bolt, pin, or the like for the purpose of securing shank 10 to a tow vehicle after being inserted into a receiver (not shown) as is known in the art.

The sides of arm 12 are a source of significant weight, and therefore cost, of shank 10 overall. It is advantageous to reduce the weight, and therefore cost, without detrimentally affecting the performance of shank 10. Preferred arm side 22 may define one or more openings in the surface of arm side 22 positioned such that a reduction in material does not affect the structural integrity of shank 10. Preferably, arm side 22 defines cavity 23 positioned more proximal rack 11 and hollow 24 positioned more distal rack 11. As shown clearly in FIG. 2, the walls of cavity 23 and hollow 24 each arcuately slope from the surface of arm side 22 to the respective planar bottoms. The center point of both cavity 23 and hollow 24 is slightly off-center, resulting in a geometry that includes two relatively equal sides, cavity longitudinal sides 25, 25' and hollow longitudinal sides 40, 40', separated about the longitudinal axis of arm 12, and two asymmetrical sides, cavity lateral sides 26, 26' and hollow lateral sides 41, 41', divided along a lateral axis of arm 12.

Asymmetrical cavity lateral side 26 and hollow lateral side 41 are each significantly longer in terms of distance from the center point than the opposing lateral sides 26' and 41', respectively, resulting in a much greater slope defined by the "shorter" cavity lateral side 26' and hollow lateral side 41' and a shallower slope defined by the "longer" cavity lateral side 26 and hollow lateral side 41. In one embodiment of shank 10, cavity 23 defines triangular-shaped corner sides 27, 27' which correspond in size depending on which side of the lateral axis they are positioned (i.e. the triangles 27 near "short" side 26' are smaller than triangles 27' near "long" side 26).

Figure 9:
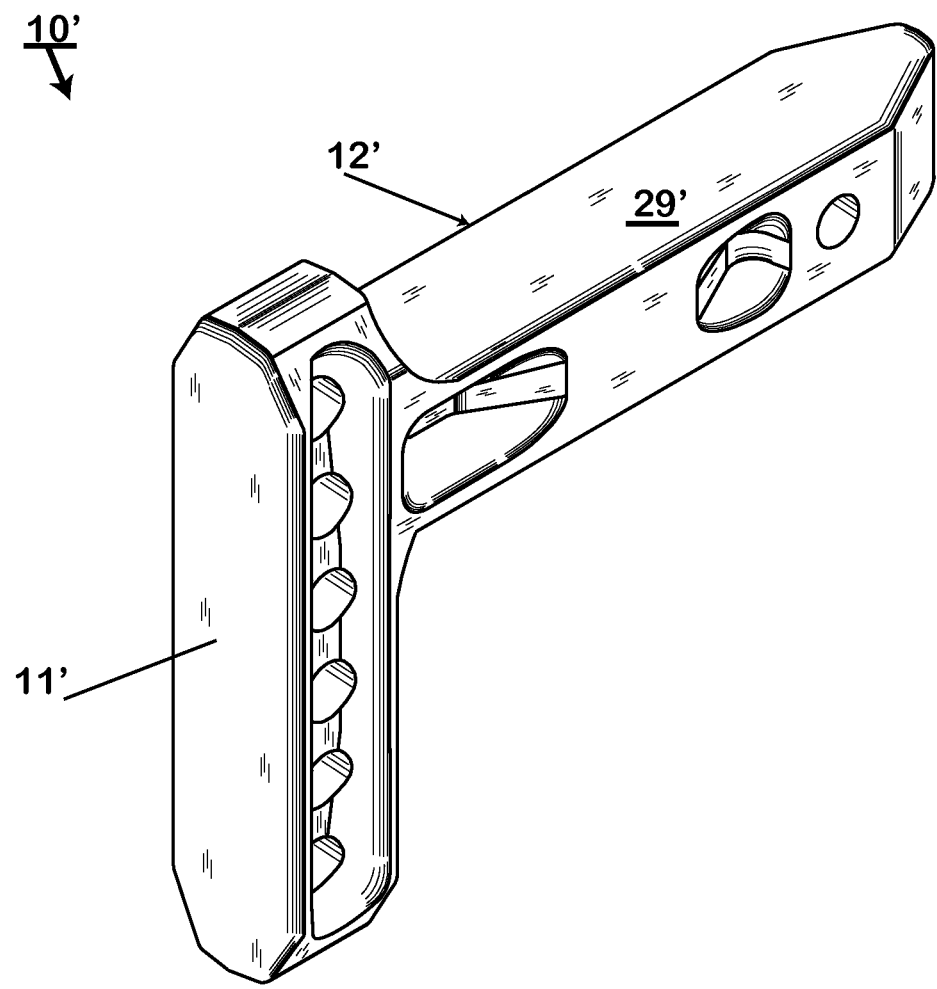
FIG. 9 pictures an alternate embodiment of a trailer shank.

Arm top 29 is formed continuously with rack 11 and may serve multiple purposes. In one embodiment of shank 10, top 29 is not uniform and defines a first portion with a central spine running parallel to the longitudinal axis of arm 12. A pair of opposing sides 30, 30' gently slope downward away from the midline spine, creating a crowned surface. Sides 30, 30' extend approximately half the length of arm 12 and terminate in a pair of shoulders 31, 31'. The opposing side of top 29 beyond shoulders 31, 31' defines top planar surface 32, forming a slight curved edge on each lateral side. The joining of sloping sides 30, 30' at respective shoulders 31, 31' creates the appearance of notch 33. In an embodiment of arm 12, arm bottom 34 defines shoulders similar to shoulders 31, 31' of arm top 29, resulting in a similar appearance to top notch 33. In alternate embodiment shank 10' as shown in FIG. 9, arm 12' defines a substantially planar top surface 29'. Otherwise, this alternate embodiment is similar in all respects as previously described.

A method of manufacturing shank 10 is also provided and includes the steps of providing a rigid material such as high-quality, carbon steel to form a monolithic shank, forging the material to form shank 10 as described above, and heat treating shank 10 to produce a stronger, tougher, more durable shank than is known in the art. By forging a monolithic shank 10 instead of welding the components together as is commonly done, the overall structural integrity of shank 10 is increased while decreasing production time and cost.

The illustrations and examples provided herein are for explanatory purposes and are not intended to limit the scope of the appended claims.

I claim:

1. A monolithic trailer shank comprising a rack with a plurality of apertures, the rack integrally formed with an arm defining a pair of oppositely biased faces and a cavity with a pair of longitudinal sides and a pair of lateral sides, one of the lateral sides longer than the other lateral side, the cavity defining a plurality of triangularly shaped corner sides.

2. The shank of claim 1 whereby the rack defines a recessed channel, the apertures positioned within the channel.

3. The shank of claim 2 whereby the recessed channel defines an arcuate bottom.

4. The shank of claim 1 whereby the arm defines a hollow distal the rack.

5. A monolithic trailer shank comprising a rack with a plurality of apertures positioned in a recessed channel, the rack integrally formed with an arm defining a hollow and a cavity with a pair of equally oriented longitudinal sides and a pair of lateral sides with one of the lateral sides longer than the other, the cavity defining a plurality of triangular shaped corner sides, the cavity positioned more proximal the rack and the hollow positioned more distal the rack, the arm forming an end with a pair of oppositely biased faces, whereby the shank is formed by forging.

6. The shank of claim 5 further comprising a brace positioned between the rack and the arm.

7. The shank of claim 5 whereby the hollow includes a pair of equally oriented longitudinal sides.

8. The shank of claim 7 whereby the hollow includes a pair of lateral sides, one of the sides longer than the other.

9. The shank of claim 5 whereby the arm defines an aperture.

10. The shank of claim 5 whereby the shank defines a fillet space in communication with an arm top.

11. The shank of claim 10 whereby the arm top defines a planar surface.

12. The shank of claim 10 whereby the arm top defines a pair of sloped sides.

13. The shank of claim 12 whereby the sloped slides join a planar surface at a pair of corresponding shoulders.

14. The shank of claim 5 whereby the recessed channel defines an arcuate bottom.

15. The shank of claim 5 whereby the arm defines a top notch.

16. The shank of claim 5 whereby the arm defines a bottom notch.

17. A monolithic trailer shank defining a fillet space and comprising a rack with a plurality of apertures positioned in a recessed channel, the rack integrally formed with an arm defining a cavity and a hollow, the cavity positioned more proximal the rack and the hollow positioned more distal the rack, the arm forming an end with a pair of opposingly biased faces, the aim defining a top with sloped sides joining a planar surface at a pair of corresponding shoulders, whereby the shank is formed by forging.

18. The shank of claim 17 whereby the cavity includes a pair of equally oriented longitudinal sides and a pair of lateral sides, one of the lateral sides longer than the other lateral side.

19. The shank of 17 whereby the hollow includes a pair of equally oriented longitudinal sides and pair of lateral sides, one of the lateral sides longer than the other lateral side.

20. The shank of claim 17 whereby the recessed channel defines an arcuate bottom.

\* \* \* \* \*